US007000938B2

(12) United States Patent
Watkins

(10) Patent No.: US 7,000,938 B2
(45) Date of Patent: Feb. 21, 2006

(54) FOLDING SEAT SUPPORT STRUCTURE

(75) Inventor: Mervyn M. Watkins, Rancho Palos Verdes, CA (US)

(73) Assignee: Convaid Products, Inc., Torrance, CA (US)

( * ) Notice: Subject to any disclaimer, the term of this patent is extended or adjusted under 35 U.S.C. 154(b) by 0 days.

(21) Appl. No.: 10/379,680

(22) Filed: Feb. 14, 2003

(65) Prior Publication Data

US 2003/0155746 A1 Aug. 21, 2003

Related U.S. Application Data

(60) Provisional application No. 60/357,583, filed on Feb. 15, 2002.

(51) Int. Cl.
*B62B 7/08* (2006.01)
(52) U.S. Cl. ...................................... 280/642; 280/650
(58) Field of Classification Search ................ 280/639, 280/39, 641, 642, 644, 42, 647, 650, 657, 280/658; 29/428
See application file for complete search history.

(56) References Cited

U.S. PATENT DOCUMENTS

| 3,390,893 | A | * | 7/1968 | MacLaren ..................... 280/39 |
| 3,736,021 | A | * | 5/1973 | MacLaren ..................... 297/42 |
| 3,995,882 | A | * | 12/1976 | Watkins ...................... 280/649 |
| 4,083,579 | A | * | 4/1978 | Basey et al. ................ 280/650 |
| 4,989,890 | A | * | 2/1991 | Lockard et al. ............... 280/42 |
| 6,113,128 | A | * | 9/2000 | Watkins ...................... 280/647 |
| 6,206,405 | B1 | * | 3/2001 | Watkins ...................... 280/647 |
| 6,264,218 | B1 | * | 7/2001 | Slagerman ................... 280/43 |
| 6,443,480 | B1 | * | 9/2002 | Wu ............................ 280/649 |
| 6,616,172 | B1 | * | 9/2003 | Cockram .................... 280/647 |

* cited by examiner

*Primary Examiner*—Frank Vanaman
(74) *Attorney, Agent, or Firm*—Louis J. Bovasso, Esq.; Greenberg Traurig, LLP

(57) ABSTRACT

A folding support structure includes a frame assembly having frame supports, seat supports, back supports, and a plurality of frame brace assemblies. The folding structure also includes a seat structure coupled to the frame assembly. The folding support structure is configured to collapse in a front-to-back manner and in a side-to-side manner.

5 Claims, 6 Drawing Sheets

FOLDING SEAT SUPPORT STRUCTURE

CROSS-REFERENCE TO RELATED APPLICATIONS

The contents of this application are related to the provisional application having Ser. No. 60/357,583, filed Feb. 15, 2002. The contents of this related provisional application is incorporated herein by reference.

BACKGROUND OF THE INVENTION

1. Field of the Invention

This invention relates to folding support structures and more particularly to support systems for child strollers and chairs.

2. General Background and State of the Art

Folding structures of the type adapted to support an object or a person are well known in the art. Most of these structures fold only in one dimension, resulting in a rather bulky configuration when considering ease of storage and transportation. Others fold in multiple dimensions, but do not provide adequate seat and back support for an occupant seated in the structure.

Some folding structures include wheels to facilitate movement of the structure when it is supporting a person, such as baby carriages or strollers having wheels for ease of movement of the stroller and its occupant. A typical example of this type configuration is described in U.S. Pat. No. 3,390,893 directed to structures for folding baby carriages, chairs, and the like.

Some existing structures include X frames which are pivotally connected by means of pivot joints, the frames being held in their unfolded position at a fixed angle with respect to each other by rigid brace members pivotally connected to the frames. One X frame is usually more or less vertical and located at the back of the structure, while the other is at the bottom of the structure and is generally horizontal in its unfolded position. In its folded configuration, the two X frames collapse and all elongated elements thereof are nearly parallel. The brace elements also fold about pivoted interconnections so that the ends of the X frames come together. This moves the front wheels near the location of the carriage's handles where they may soil clothes, for example, and, because of this elevated mass, a clip is required in order to retain the structure in a folded position. Thus, it should be evident that a foldable support structure that is simple in construction and that folds into a slim configuration while maintaining a low center of mass with all wheels always located near the ground level and that does not require a clip mechanism to hold the structure in its folded position, and that provides sturdy support for a seated occupant, would constitute a significant advancement of the art.

In U.S. Pat. No. 3,995,882, a folding structure in one embodiment includes ground wheels and handles to form a child's stroller, the structure having a pair of elongated frame tubes that are laterally foldable and held together at two spaced points on each of the tubes by pivotally connected front and rear X braces, the structure also including a pair of elongated seat tubes pivotally attached to main frame tube-supported folding mechanisms that allow the seat tubes to move upwardly and in closer angular alignment with the main frame tubes when the latter move closer together as the structure is changed from its unfolded to folded configuration, resulting in a folded cross-sectional area not much greater than the sum of the cross-sectional areas of the individual members.

The folding structures described above do not provide for a sturdy back support for children or adults seated in the chair. Therefore, there is a need in the art for a folding support structure with a sturdy back support that is capable folding into a compact configuration for ease of storage and transportation, such as in both a side-to-side and a front-to-back manner.

INVENTION SUMMARY

The present invention provides a folding support structure having a seat structure supported by a system of frame components. The support structure of the present invention is foldable in a front-to-back and a side-to-side manner. Back support members provide added support for a seat structure, which includes a back portion and a seat portion. The back support members couple to the back portion and provide a person seated in the chair with added comfort and stability when seated in the folding support structure, while still allowing the folding support structure to fold into a compact configuration in a side-to-side and front-to-back manner.

In one aspect of the present invention, a folding support structure comprises a frame assembly that has a system of support members, including frame support members, seat support members, and back support members, the back support members each coupling a frame support member to a seat support member. The frame assembly also includes a plurality of foldable frame brace assemblies, a first one of the plurality of foldable frame brace assemblies connecting the frame support members, and a second one of the plurality of foldable frame brace assemblies connecting the seat support members, and a seat structure including a seat portion and a back portion, the seat structure coupled to the frame support members, to the seat support members, and to the back support members, the back support members allowing the seat structure to firmly support a person seated therein by providing tension in the seat structure at positions in the frame assembly where the back support members connect the frame support members to the seat support members. The system of support members and the plurality of frame brace assemblies allow the frame assembly to fold in a front-to-back manner and in a side-to-side manner.

In another aspect of the present invention, a method of affording a foldable support structure comprises providing a frame assembly that has a system of support members, the system of support members including frame support members, seat support members, back support members, and support connector members, the back support members each coupling a frame support member to a seat support member. The method also includes coupling a seat structure to the frame assembly, the seat structure including a seat material and a backing material, the seat structure being coupled to the frame assembly at the frame support members, the seat support members, and at the back support members, the back support members allowing the seat structure to firmly support a person seated therein, and means for folding the frame assembly in a front-to-back manner and in a side-to-side manner.

In yet another aspect of the present invention, a method of affording a foldable support structure includes providing a frame assembly having a system of support members, the system of support members including frame support members, seat support members, back support members, and support connector members, the back support members each coupling a frame support member to a seat support member. The method further includes coupling a seat structure to the frame assembly, the seat structure including a seat material and a back material, the seat structure being coupled to the frame assembly at the frame support members, the seat support members, and at the back support members, the back support members allowing the seat structure to firmly support a person seated therein. The method also includes means for folding the frame assembly in a front-to-back manner and in a side-to-side manner.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION OF THE EMBODIMENTS

In the following description of the present invention reference is made to the accompanying drawings which form a part thereof, and in which is shown, by way of illustration, exemplary embodiments illustrating the principles of the present invention and how it may be practiced. It is to be understood that other embodiments may be utilized to practice the present invention and structural and functional changes may be made thereto without departing from the scope of the present invention.

Figure 1:
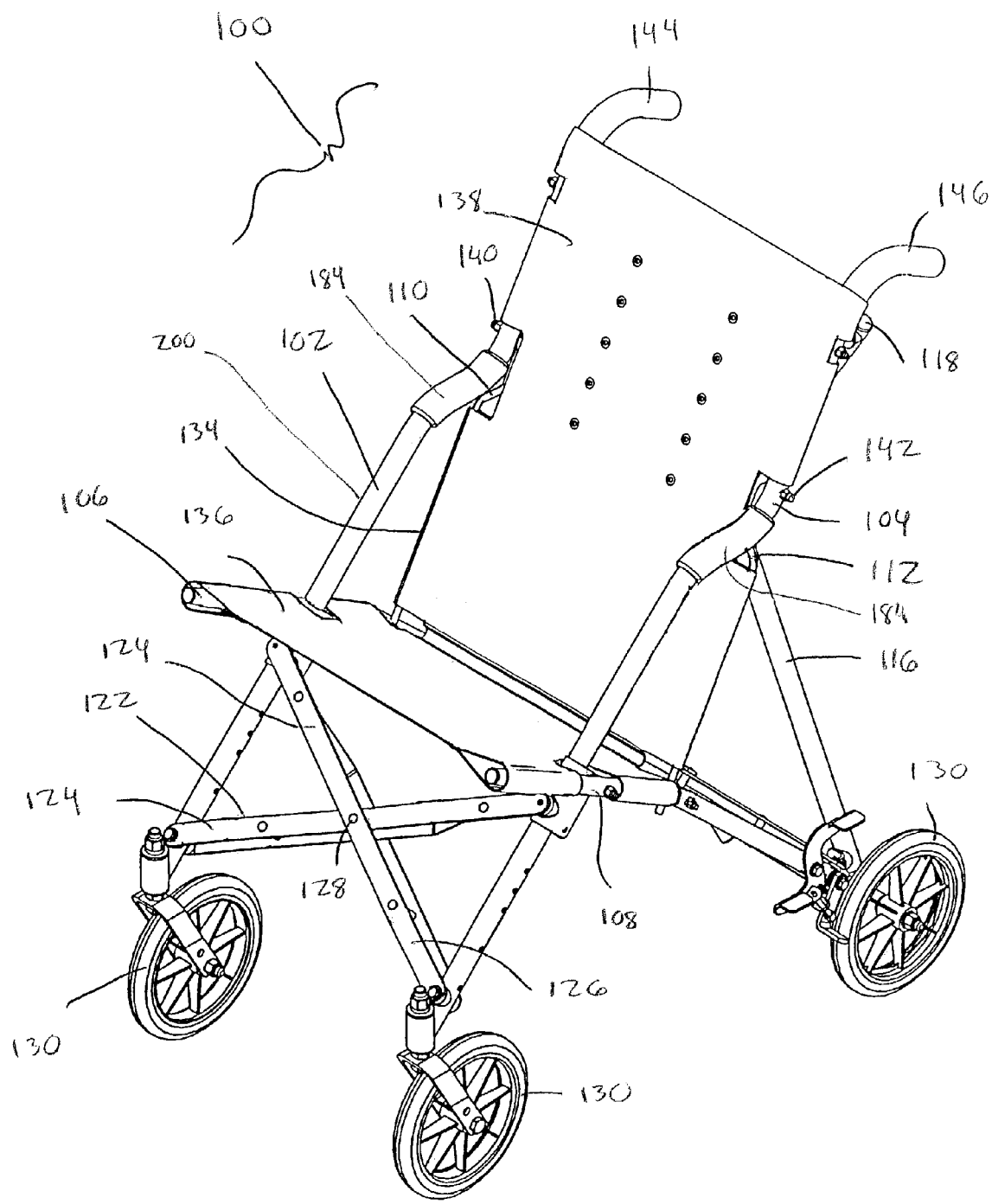
FIG. 1 is a perspective view of a folding support structure according to one embodiment of the present invention.

FIG. 1 is a perspective view of a folding support structure 100 according to one embodiment of the present invention. The folding support structure 100 has a frame assembly 200 that includes a first frame support member 102 and a second frame support member 104. The folding support structure 100 also includes a first seat support member 106 and second seat support member 108. A first back support member 110 is removably and adjustably coupled to both the first frame support member 102 and the first seat support member 106. A second back support member 112 is removably and adjustably coupled to both the second frame support member 104 and the second seat support member 108. The first and second back support members 110 and 112 are coupled to the first and second frame support members 102 and 104 at couplings 140 and 142, respectively, and at couplings 158 and 160. The couplings 140 and 142 may include inserting a back support member into a recess within a frame support member, such that the back support member is removable. The back support members may be coupled to the frame support members in any form in which they are movable relative to the frame support members 102 and 104 so that the folding support structure 100 can be folded. In one embodiment, the couplings 158 and 160 may include pins that allows the back support members 110 and 112 to couple to the seat support members 106 and 108 through the insertion of an end of a back support member into an opening in the pin, the pin then being insertable into one of a plurality of holes in the seat support member and securable by nuts 166 and 168.

Also shown in FIGS. 1–5 are a plurality of foldable frame brace assemblies each having a plurality of pivotally interconnected frame brace members. A front frame brace assembly 122 includes a first front frame brace member 124 coupling the first frame support member 102 and the second frame support member 104. A second front frame brace member 126 also couples to the first and second frame support members 102 and 104. The two front frame brace members 124 and 126 meet at a coupling point 128. The coupling point 128 allows the first and second front frame brace members 124 and 126 to collapse relative to the first and second frame support members 102 and 104 so that they are increasingly substantially parallel as the first and second frame support members 102 and 104 are moved toward each other when the folding support structure 100 is being folded in a side-to-side manner. Each of the first and second front frame brace members 124 and 126 may have a plurality of bars making up each member.

Figure 2:
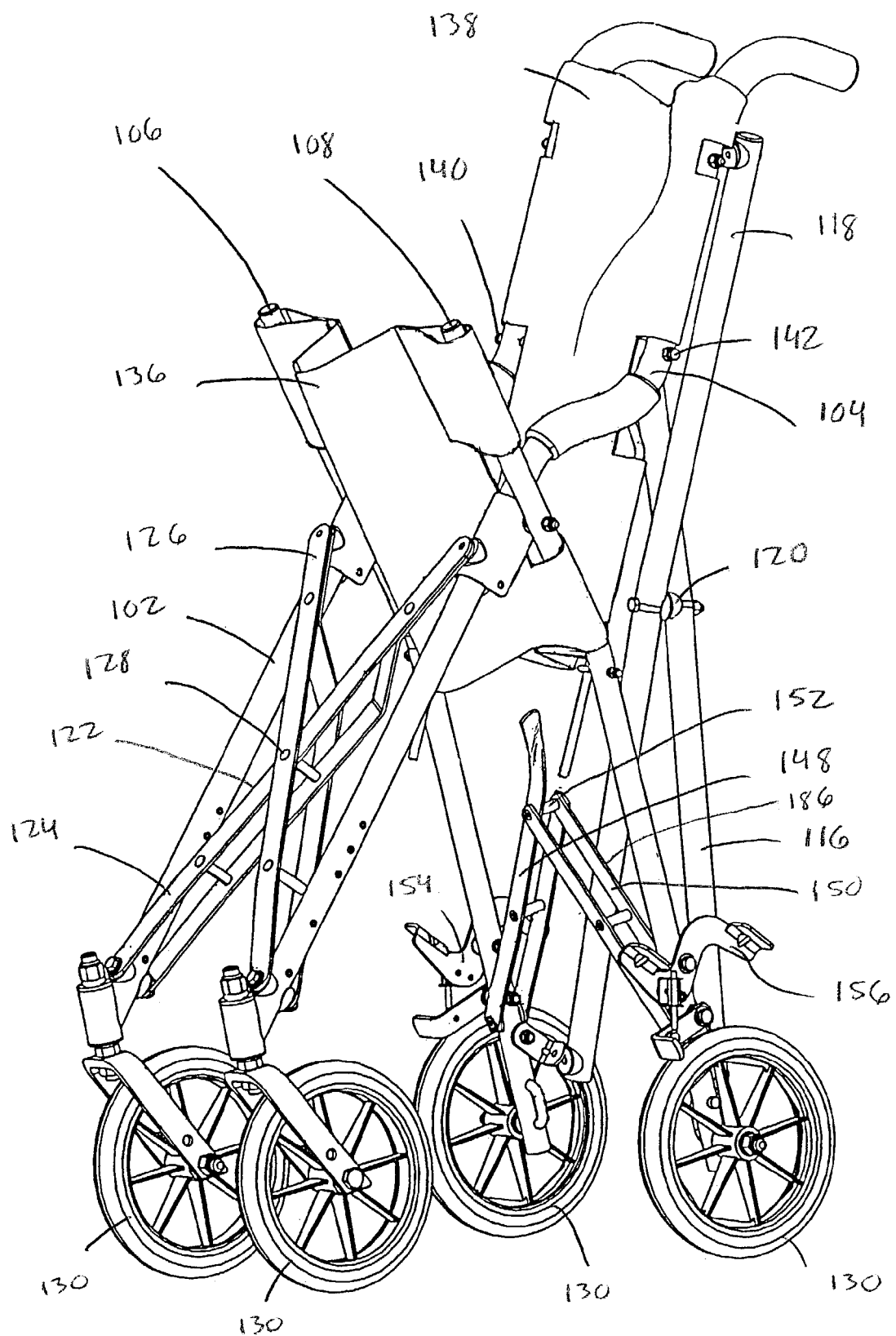
FIG. 2 is a perspective view of the folding support structure of FIG. 1 in a partially folded configuration, in both a side-to-side and front-to-back manner.

The plurality of frame brace assemblies also includes a rear frame brace assembly 186 having a first rear frame brace member 148 coupled to the first seat support member 106, a second rear frame brace member 150 coupled to the second seat support member 108, and a coupling 152. The coupling 152 allows the first and second frame brace members 148 and 150 to collapse when pushed inward toward the folding support structure 100 as shown in FIG. 2, thereby allowing the folding support structure 100 to collapse in a side-to-side manner. Each of the first and second rear frame brace members 148 and 150 may have a plurality of bars making up each member. The rear frame brace members 148 and 150 each have first and second ends and are foldable in a first plane therebetween, a first end of each rear frame brace member being pivotally attached to one of the seat support members at a lower portion thereof, and a second end of each interconnected rear frame brace member being pivotally attached to another second end of a rear frame brace member. The rear frame brace assembly 186 also includes a lock mechanism having a pivot portion joining the second ends of the rear frame brace members. The lock mechanism also includes locking means, as discussed herein, for releasably locking the rear frame brace members 148 and 150 in an unfolded position.

The frame assembly 200 of the folding support structure 100 also includes frame support connector members 116 and 118. A first frame support connector member 116 is coupled at one end to the first frame support member 102 and at another end to the second seat support member 108. A second frame support connector member 118 is coupled at one end to the second frame support member 104 and at another end to the first seat support member 106. A coupling 120 allows the first and second frame support connector members 116 and 118 to collapse relative to the first and second frame support members 102 and 104 so that they are increasingly substantially parallel as the first and second frame support members 102 and 104 are moved toward each other when the folding support structure 100 is being folded in a side-to-side manner.

FIG. 1 also shows a seat structure 134. The seat structure 134 includes a seat portion 136 and a back portion 138. The seat portion 136 and the back portion 138 are made of fabric and are flexible to provide a comfortable seat for a person using the folding support structure 100 and to allow the folding support structure 100 to fold in a side-to-side and a front-to-back manner. The seat portion 136 and the back portion 138 may be made of any flexible material that would allow the folding support structure to fold in a side-to-side and a front-to-back manner.

FIG. 2 is a perspective view of the folding support structure 100 of FIG. 1 in a partially folded configuration, in both a side-to-side and front-to-back manner. The first and second front frame brace members 124 and 126 are partially collapsed around coupling 128, and the first and second rear frame brace members 148 and 150 are partially collapsed around coupling 152. Also, the first and second frame support connector members 116 and 118 are partially collapsed around coupling 120. The partial collapse around couplings 128, 152 and 120 allows the folding support structure to collapse in a side-to-side manner such that the first and second frame support members 102 and 104 move toward each other. The coupling of the first and second frame support members 102 and 104 to the first and second seat support members 106 and 108 allows the seat structure 134 to collapse in a front-to-back manner, such that the seat portion 136 moves toward the back portion 138.

Figure 3:
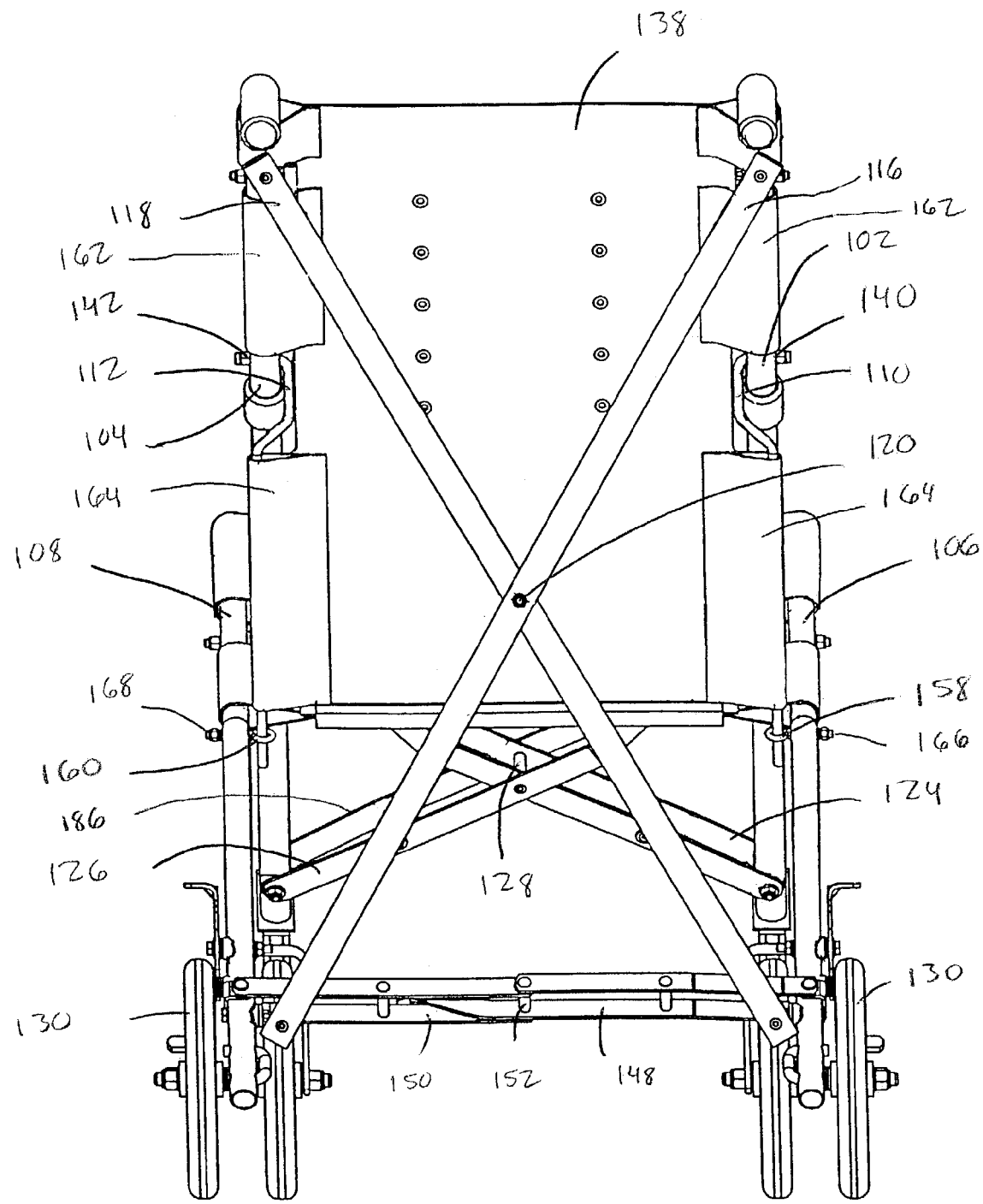
FIG. 3 is a rear view of the folding support structure of FIG. 1.

FIG. 3 is a rear view of the folding support structure of FIG. 1 and FIG. 2. FIG. 3 shows the back portion 138 having a series of pockets 162 and 164. Pockets 162 are used to couple the back portion 138 to the first and second frame support members 102 and 104. Pockets 164 are used to couple the back portion to the first and second back support members 110 and 112. The first and second back support members 110 and 112 are used to provide a firm backing for the back portion 138 to provide increased support and comfort to a person seated in the folding support structure 100.

FIG. 3 also shows the first and second back support members 110 and 112 removably coupled to the first and second seat support members 106 and 108 at couplings 158 and 160, respectively. In one embodiment, couplings 158 and 160 are looped attachments coupled to the first and second frame support members 102 and 104. The first and second back support members 110 and 112 are positionable through the looped attachments. The first and second back support members 110 and 112 can be tightened and loosened for desired positioning by rotating nuts 166 and 168.

FIG. 3 shows the folding support structure 100 in its full in-use position. First and second front frame brace members 124 and 126 are fully extended relative to the first and second frame support members 102 and 104. Also, first and second rear frame brace members 148 and 150 are fully extended relative to the first and second seat support members 106 and 108.

Figure 4:
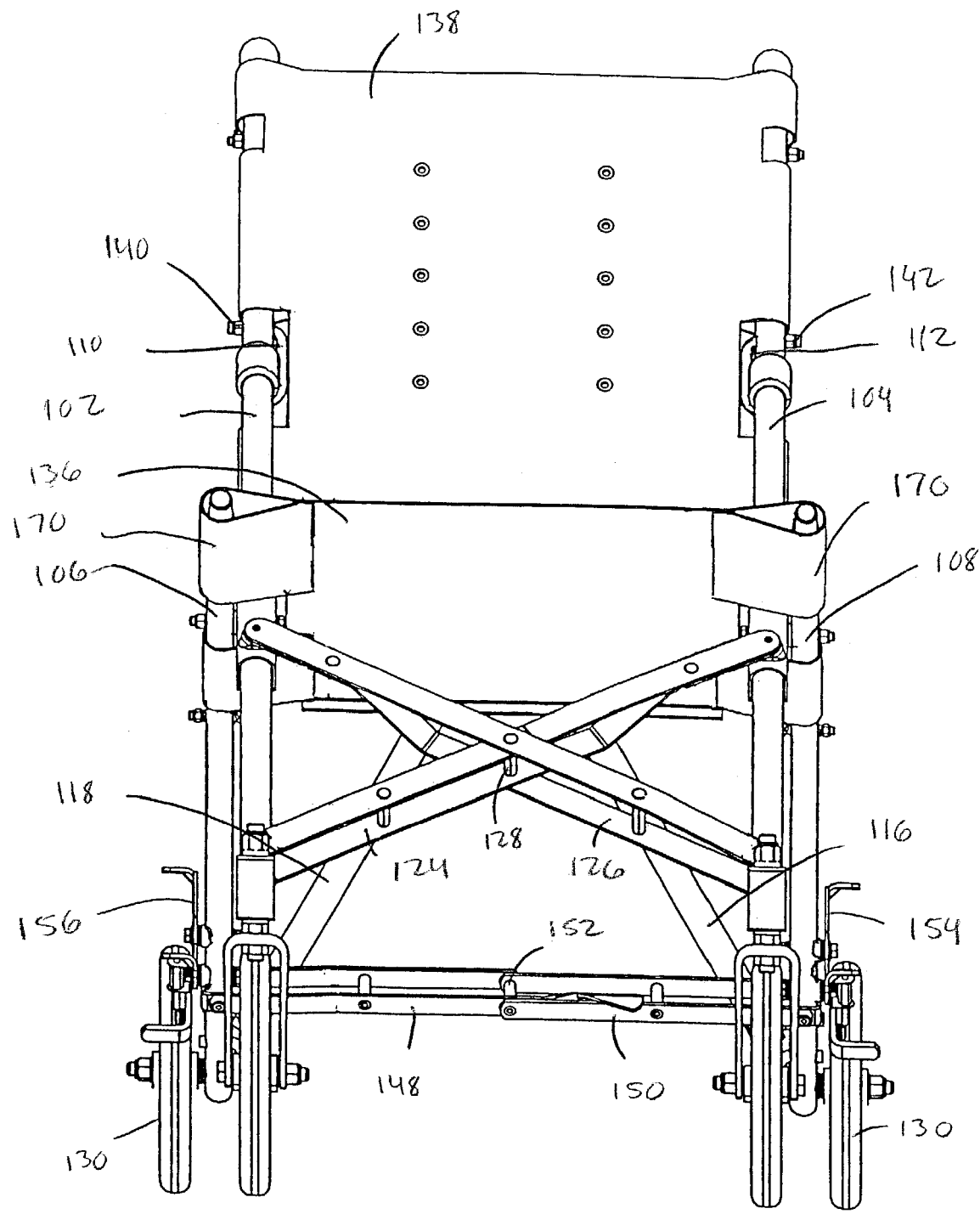
FIG. 4 is a front view of the folding support structure of FIG. 1.

FIG. 4 is a front view of the folding support structure 100 in its full-use position. First and second front frame brace members 124 and 126 are fully extended relative to the first and second frame support members 102 and 104. Also, first and second rear frame brace members 148 and 150 are fully extended relative to the first and second seat support members 106 and 108. The seat portion 136 includes pockets 170 which couple the seat portion 136 to the first and second seat support members 106 and 108. FIG. 3 and FIG. 4 show the back portion 138 having a series of holes thereon.

Figure 5:
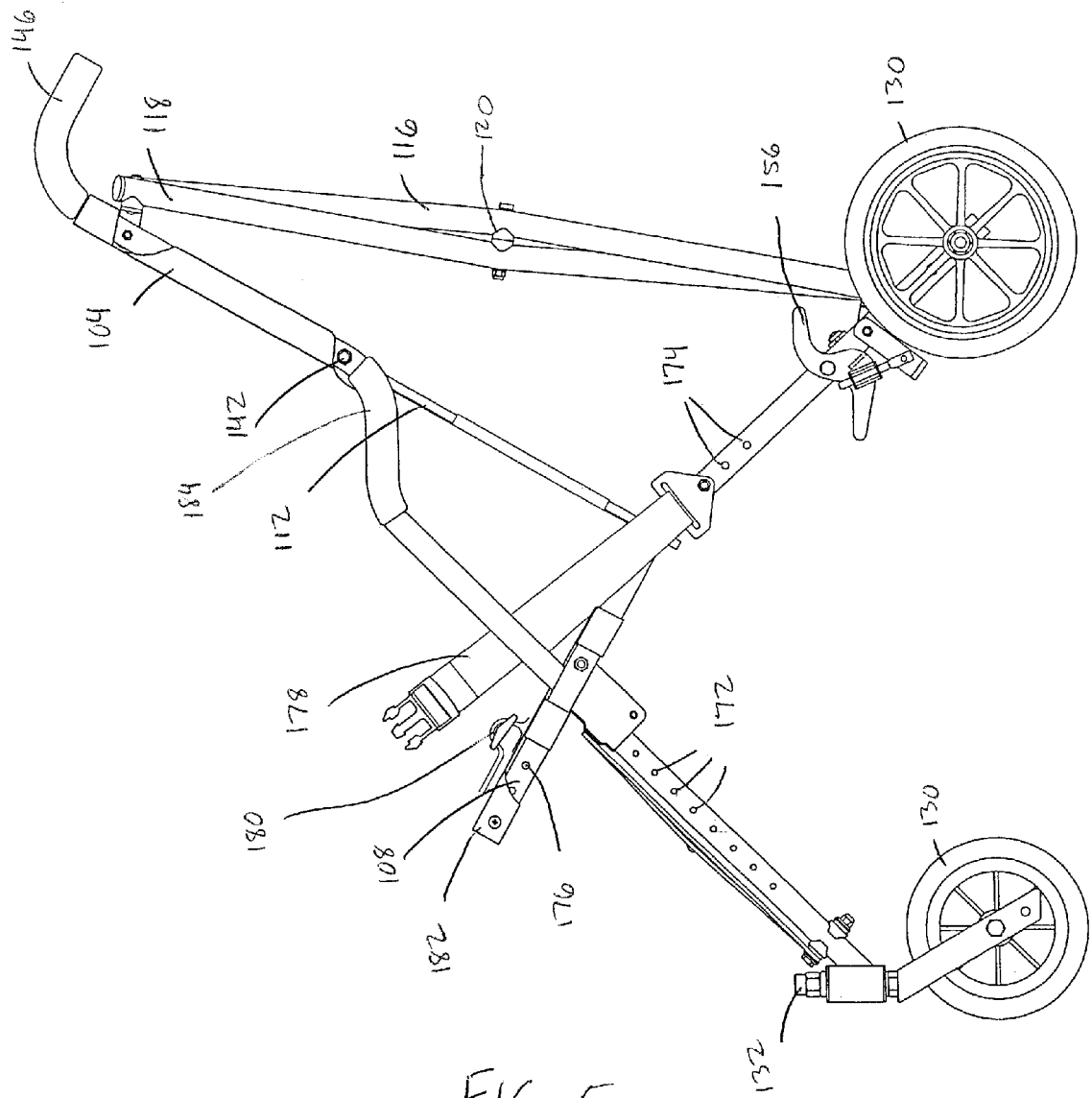
FIG. 5 is a side view of the folding support structure of FIG. 1.

FIG. 5 is a side view of the folding support structure 100 of FIG. 1. FIG. 5 shows that the first and second frame support members 102 and 104 have a series of holes 172 disposed therein for coupling to the first and second seat support members 106 and 108. Users of the folding support structure can adjust the positioning of the first and second frame support members 102 and 104 relative to the first and second seat support members 106 and 108 to accommodate users of different sizes. The first and second seat support members 106 and 108 have a series of holes 174 disposed therein. A belt 178 may be included to keep a user of the folding support structure 100 firmly and securely seated in the structure. The series of holes 174 are provided to adjust the positioning of the belt 178 to accommodate users of different sizes.

FIG. 5 also shows that the first and second seat support members 106 and 108 have an additional series of holes 176 disposed therein. A pommel or stop 180 may be included to prevent users of the folding support structure 100 from sliding forward while seated in the seat portion 136. The additional series of holes 176 are used to adjust the positioning of the pommel or stop 180. In another embodiment, the holes 176 are used to adjust the end 182 of the seat portion 136 to accommodate users of different sizes in the folding support structure 100.

The folding support structure 100 may also include a series of wheels 130 for allowing the folding support structure 100 to move along the ground with stability. Each wheel 130 includes an attachment mechanism 132 for attaching the wheel 130 to the folding support structure 100. The wheels 130 positioned at the front of the folding support structure 100 are coupled to the lower ends of the first and second frame support members 102 and 104. The wheels 130 positioned at the rear of the folding support structure 100 and coupled to the lower ends of the first and second seat support members 106 and 108 may also include brake mechanisms 154 and 156 that can be activated to stop the movement of the wheels 130. Brake mechanisms 154 and 156 may further include a lever for manually activating the brake mechanisms 154 and 156 and stopping the movement of the wheels 130.

The folding support structure 100 may also have foot rests and arm rests 184 to provide more comfort for a person seated in the chair. The arm rests 184 may be padded areas of the first and second frame support members 102 and 104. The foot rests may be coupled to the first and second frame support members 102 and 104 below their intersection with the first and second seat support members 106 and 108. The foot rests may be adjustable and removable from the frame support members 102 and 104. The holes 172 in the first and second frame support members 102 and 104 may be used to removably couple the foot rests to the first and second frame support members 102 and 104.

Figure 6:
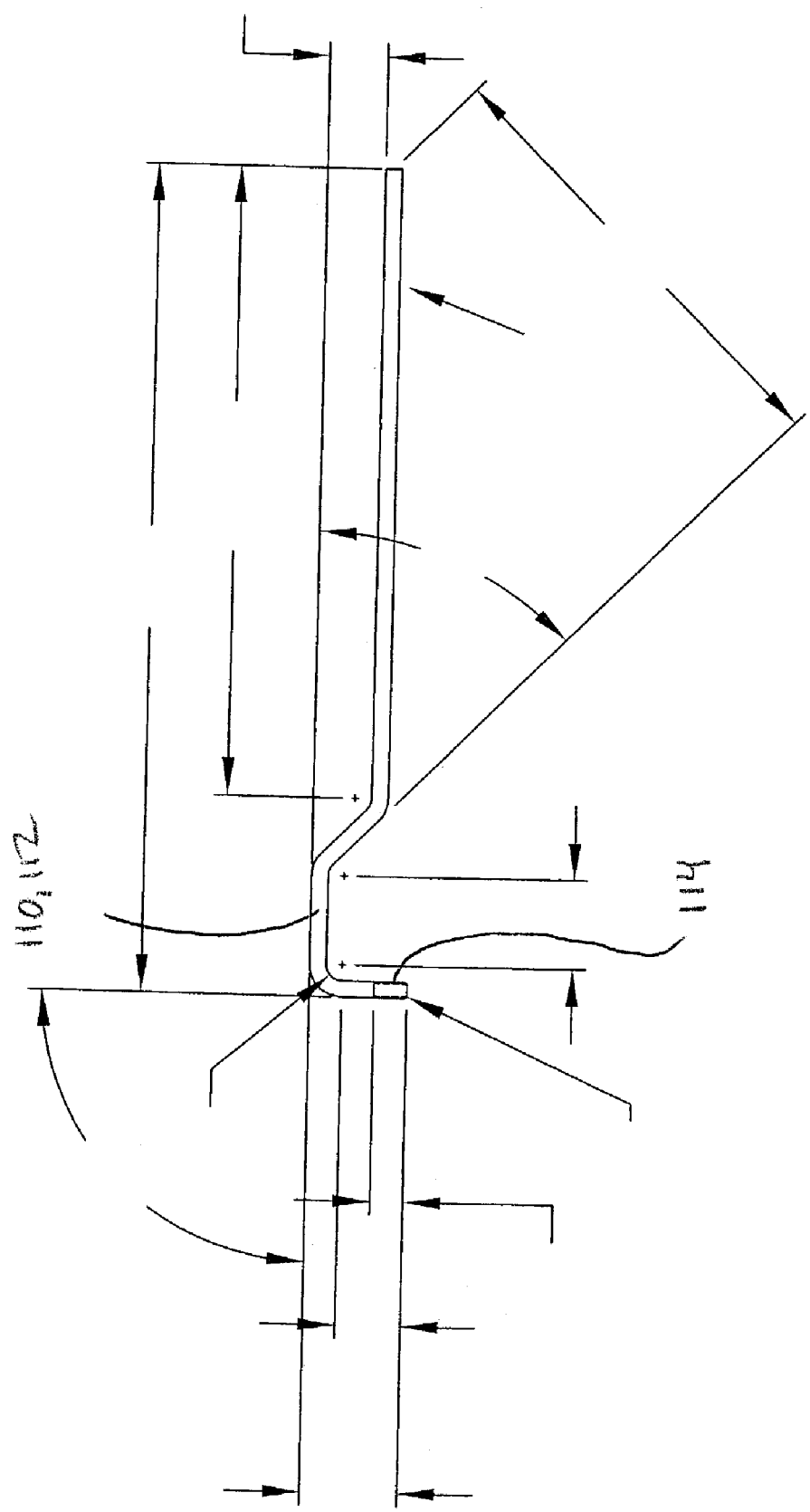
FIG. 6 is a design drawing of a back support member component of a folding support structure according to one embodiment of the present invention.

FIG. 6 is a design view of a back support member 110 of the folding support structure 100. At one end 114, the back support member is curved to insert into a recess or hole in a frame support member. The end 114 may be threaded to provide a more secure insert into the frame support member. The recess or hole of the frame support member may also be threaded to receive the threaded end 114 of the back support member.

Although the present invention has been shown and described with reference to particular embodiments, various changes and modifications which are obvious to persons skilled in the art to which the invention pertains are deemed to lie within the spirit, scope and contemplation of the invention.

The frame support members 102 and 104 may include a pair of rigid elongated metal frame tubes having upper portions, lower portions, and intermediate portions. The seat support members 106 and 108 may include a pair of rigid elongated seat tubes each having upper portions, lower portions, and attachment or intermediate portions. Planes defined by the associated frame support members 102 and 104 and seat support members 106 and 108 may intersect along a line that is essentially perpendicular to the longitudinal axes of the frame and seat support members in the intermediate portions of the respective members.

The rear frame brace assembly 186 may include a pair of rigid rear frame brace members pivotally interconnected, the respective lower portions of these members being pivotally attached to a different one of the seat support members 106 and 108 at their lower portions, and respective upper portions of the members being pivotally attached to a different one of the frame support members at their upper portions. The pivotal interconnections at the upper ends of the rear frame brace members 148 and 150 and the pivotal interconnections at the lower ends thereof are of the two-axis type, one of which being perpendicular to a plane defined by the rear frame brace members 148 and 150 and the other axis of which being orthogonal thereto and in the plane of the respective associated tubes to which the interconnections are attached. The pivotal interconnections may, for example, take the form of L-brackets having one arm loosely riveted to a rear frame brace member, and having another arm loosely riveted to one of the tubes.

The lower portions of respective front frame brace members 116 and 118, comprising the front frame brace assembly 122, are pivotally attached by rivets or nut/bolt assemblies, for example, to the lower portions of the frame support members 102 and 104. As with the rear frame brace assembly 122, the front frame brace members 116 and 118 are pivotally interconnected by any conventional means such as a rivet, for example, at a point intermediate the ends of these members so that the front frame brace assembly 122 may fold and unfold in the plane of the members and generally parallel to the plane defined by the two frame support members 102 and 104. The lower portions may also be with horizontal foot rest configurations in order to comfortably accommodate a child's feet when the structure is in its unfolded position.

In one embodiment, the upper portions of the front frame brace members 116 and 118 are pivotally attached to a front face of a different sliding U-channel bracket slidably mounted on the intermediate portions of the frame support members 102 and 104. A rivet may be used as the pivot pin seated in a raised portion of the bracket so as not to interfere with the sliding action of the bracket on the frame support member. Also pivotally attached to each sliding bracket is the intermediate portion of an associated seat support member by means of a rivet or bolt extending through parallel sides of the bracket and also through a tube-conforming spacer and appropriate aligned holes in the seat support members 106 and 108.

The folding support structure 100 may also include a means for preventing the rotation of the sliding brackets on the frame support members 102 and 104 when the folding support structure 100 is in its unfolded configuration. This may be accomplished by providing a square cross section in the intermediate portion of a frame support member, and by using a sliding bracket having a conforming square cross section. The brackets may be formed from a rectangular sheet of metal folded two times at right angles so that the two parallel sides may be suitably fastened together by the rivet or bolt and a rivet or bolt through holes using equal length spacers extending between the inner surfaces of the sides thereby enclosing the brackets about the portions. Of course, other cross-sectional configurations may be used to provide the same function. For example, the cross sections of both the frame support members' intermediate portions and sliding brackets may be circular, the latter having one or more notches in their lower edges to register with associated pins extending outwardly from the seat support members 106 and 108.

In accordance with another embodiment of the invention, wheels 130 are provided adjacent the lower ends of the frame and seat support members. The wheels 130 are rotatably mounted on J-shaped axle rods each having a relatively shorter section and a relatively longer section joined by a transverse section. The parallel sections extend through suitably disposed aligned holes through the tubes and secured in position by conventional means such as push nuts at the ends thereof. A flat washer may be seen disposed between the support member and the wheels.

In another embodiment of the present invention, a pivot arm mechanism may be used in place of the previously described sliding bracket arrangement. In this embodiment, the intermediate portions of the frame support members 102 and 104 may be of any convenient cross-sectional configuration. The upper portions of the front frame brace members 116 and 118 pivotally attach to associated attachment or intermediate portions of the seat support members 106 and 108 by means of, for example, L-brackets and appropriate fasteners such as rivets, the latter having axes at right angles to each other to provide a two-axis joint at each of the pivotal interconnections.

According to this embodiment, the intermediate portions of the seat support members 106 and 108 are movably supported with respect to the frame support members 102 and 104 by separate pivot arms respectively pivotally attached at one of their ends by rivets to the seat support members 106 and 108, and at the other ends by rivets to the associated intermediate portions of the frame support members 102 and 104. This arrangement allows the seat support members 106 and 108 to swing on the pivot arms and move upwardly with respect to the frame support members 102 and 104 as the brackets pivot downwardly about pins when the front frame brace assembly 122 is folded. This is very similar to the general movement and alignment of the various components of the folding structure previously described, where the sliding bracket is utilized.

For convenience, and as an aid for supporting the folding support structure 100 when not in use, the upper portions of the frame support members 102 and 104 may be provided with curved handle portions 144 and 146, as shown in FIGS. 1–5. These handles 144 and 146 are preferably curved in an upward and forward direction for ease of handling when the folding support structure 100 is occupied. The folding support structure 100 may also include a conventional seat belt arrangement 178 to prevent an occupant from leaving the seat structure 134 and possibly falling to the ground.

The unfolding/folding operation of the folding support structure 100 is easily accomplished by simply pulling apart the two handle portions 144 and 146 and allowing a rear lock mechanism to fall into place. The rear lock mechanism is implemented by coupling 152 and by the rear frame brace members 148 and 150. This mechanism includes, in accordance with one embodiment of the invention, a pair of spaced parallel folding arms 148 and 150, each pair pivotally attached at a first of their ends to opposite sides of an associated lower portion of a seat support member, and pivotally attached at their second ends to each other, by a common pivot pin 152. The arms in each pair may be maintained in a parallel relationship by the use of a spacer tube coaxial with the pin, and the pivoting of the arms may be restricted at or just below the horizontal by a portion of at least one of the arms extending beyond the pivot pin and having an upper transverse tab that engages the upper surface of an associated arm of the opposite pair when the brace assembly is in its unfolded horizontal position. In embodiments of the invention utilizing single wheels rotatably mounted on cantilevered axles, the lock mechanism is preferably pivotally mounted on the seat tubes to prevent possible rotation of the seat support members about their own longitudinal axes. However, if dual wheels are mounted on each of the seat support members, then significant rotational torques will not be present at the seat support members and the lock mechanism may be pivotally anchored to the lower portions of the rear frame brace assembly, for example.

In order to move the support structure from its unfolded to folded configuration, the central pivoting portion of the rear lock mechanism is moved upward by the operator's foot, for example, while the two handle portions 144 and 146 are pushed together. This causes the front and rear frame brace assemblies 122 and 186 to fold and the attachment portions of the seat support members 106 and 108 to move upwardly relative to their respective associated frame support members 102 and 104 so that the angles between the associated frame and seat support members lessens until these members are nearly parallel.

It will be seen that, in one embodiment of the present invention, the rear wheels of the present invention are moved only to a relatively low position, just above the front wheels, so that there is less possibility that they would come into contact and thereby soil a user's clothing when handling the structure in its folded configuration. Also, this low center of mass arrangement precludes the structure from tending to unfold by itself.

In order to prevent the support structure from rolling down an incline, for example, a conventional wheel-impingeable brake bracket may be pivotally attached to a lower portion of one of the seat support members.

As shown in FIGS. 1–5, a flexible, pouch-like structure of cloth or plastic material, for example, may be disposed between the seat support members by attaching its lower forward outer ends to the upper portions thereof and at its upper outer ends to the frame support members adjacent the pivotal interconnections.

In view of the foregoing, it should be evident that there has herein been described a novel and highly useful folding support structure that is safe, easily operated and that incorporates improved convenient features heretofore not available in such structures.

It should be understood that although certain materials have been identified in the construction of the invention, nevertheless, these are only exemplary identifications and the materials mentioned herein are not critical and any material generally considered to be suitable for a given purpose may be substituted for those named.

This discussion describes some of the embodiments the present invention may encompass. It is to be understood that other embodiments may be utilized and structural and functional changes may be made without departing from the scope of the present invention. The foregoing descriptions of embodiments of the invention have been presented for the purposes of illustration and description. It is not intended to be exhaustive or to limit the invention to the precise forms disclosed. Accordingly, many modifications and variations are possible in light of the teachings herein. It is therefore intended that the scope of the invention not be limited by this detailed description.

What is claimed is:

1. A method of affording a foldable support structure comprising:

providing a frame assembly having a system of support members, the system of support members including frame support members, seat support members, back support members, and support connector members, the back support members each coupling a frame support member to a seat support member;

coupling a seat structure to the frame assembly; the seat structure including a seat material and a back material, the seat structure being coupled to the frame assembly at the frame support members, the seat support members, and at the back support members, the back support members allowing the seat structure to firmly support a person seated therein;

connecting the frame support members together and the seat support members together with a plurality of foldable frame brace assemblies, a first one of the plurality of foldable frame brace assemblies connecting the frame support members, and a second one of the plurality of foldable frame brace assemblies connecting the seat support members, wherein the system of support members and the plurality of frame brace assemblies allow the frame assembly to fold in a front-to-back manner and in a side-to-side manner;

coupling the upper ends of the frame support members to the lower ends of the seat support members with support connector members, wherein the support connector members are coupled together at a point of intersection, such that each support connector connects a frame support member to an opposing seat support member within the frame assembly.

2. The method of claim 1, including the step of curving the upper ends of the frame support members to form handles.

3. The method of claim 1, wherein said seat structure is a flexible member having a first and second end and including the step of providing flexible pockets at each of said ends through which a respective one of said seat support members is positioned.

4. The method of claim 3, including the step of providing a flexible back portion between said back support members and further providing a flexible pocket at each end of said back support portion and positioning a respective one of each said frame support members and said back support members through each respective pocket.

5. The method of claim 4, wherein the frame support members and the seat support members also include upper portions, including the step of attaching the seat structure to the upper portions of the seat support members and to the upper portions of the frame support members.

* * * * *